United States Patent
Humpherys et al.

[11] Patent Number: 6,128,682
[45] Date of Patent: Oct. 3, 2000

[54] METHOD AND APPARATUS FOR BUS ISOLATION

[75] Inventors: Brian Humpherys; John Butler, both of The Woodlands, Tex.

[73] Assignee: Compaq Computer Corporation, Houston, Tex.

[21] Appl. No.: 09/104,837

[22] Filed: Jun. 25, 1998

[51] Int. Cl.[7] .................................................. G06F 13/00
[52] U.S. Cl. .......................................... 710/102; 710/131
[58] Field of Search .................................. 710/102, 103, 710/107, 131; 714/22, 24, 8

[56] References Cited

U.S. PATENT DOCUMENTS

| | | | |
|---|---|---|---|
| 4,516,214 | 5/1985 | Ray ..................................... | 364/528.28 |
| 5,349,689 | 9/1994 | Suzuki ................................. | 710/102 |
| 5,386,567 | 1/1995 | Lien et al. ........................... | 713/100 |
| 5,471,130 | 11/1995 | Agiman .............................. | 323/303 |
| 5,473,499 | 12/1995 | Weir .................................... | 361/58 |
| 5,613,095 | 3/1997 | Moss et al. .......................... | 710/102 |
| 5,664,089 | 9/1997 | Byers et al. ......................... | 714/14 |
| 5,680,288 | 10/1997 | Carey et al. ........................ | 361/118 |
| 5,781,744 | 7/1998 | Johnson et al. .................... | 710/103 |
| 5,784,576 | 7/1998 | Guthrie et al. ..................... | 710/103 |
| 5,790,876 | 8/1998 | Shima et al. ....................... | 713/320 |
| 5,802,328 | 9/1998 | Yoshimura .......................... | 710/102 |
| 5,815,647 | 9/1998 | Buckland et al. .................. | 714/3 |
| 5,862,393 | 1/1999 | Davis ................................... | 713/300 |
| 5,875,307 | 2/1999 | Ma et al. ............................. | 710/101 |
| 5,894,212 | 4/1999 | Balogh ................................ | 320/122 |
| 5,922,060 | 7/1999 | Goodrum ............................ | 710/103 |
| 5,933,609 | 8/1999 | Walker et al. ...................... | 710/103 |
| 5,948,090 | 9/1999 | Heinrich et al. ................... | 710/128 |
| 5,964,855 | 10/1999 | Bass et al. .......................... | 710/103 |

OTHER PUBLICATIONS

Compaq Computer Corporation Technology Brief, "Remote Server Management with Integrated Remote Console", Oct. 21, 1996.

*Primary Examiner*—Paul R. Myers
*Attorney, Agent, or Firm*—Williams, Morgan & Amerson, P.C.

[57] ABSTRACT

A circuit for isolating a device from a bus includes a switch and control logic. The switch has a control input and is coupled between the bus and the device. The bus includes a first plurality of bus lines, including a first grant line. The device includes a second plurality of bus lines, including a second grant line. The control logic is coupled to the control input of the switch and adapted to detect a bus isolation event, and generate a bus isolation signal in response to the bus isolation event. The control logic provides the bus isolation signal to the control input of the switch, and drives the voltage on the second grant line to a predetermined voltage in response to the bus isolation signal. The predetermined voltage is independent of the voltage on the first grant line. A method for isolating a device from a bus includes detecting a bus isolation event. An isolation signal is generated in response to the bus isolation event. The device is isolated from the bus in response to the isolation signal. A grant line on the device is driven to a predetermined voltage in response to the isolation signal.

37 Claims, 6 Drawing Sheets

METHOD AND APPARATUS FOR BUS ISOLATION

BACKGROUND OF THE INVENTION

1. Field Of The Invention

This invention relates generally to remote management of computer systems, and more particularly, to the isolation of a remote management device from its host system if the host system is not operable.

2. Description Of The Related Art

Remote server management devices have been used to remotely access and administrate server computer systems. Remote server management devices allow a system administrator to dial in to a server or one server in a group of servers and monitor the status or administrate the server from a remote location. Remote server management devices are either embedded components in the server or expansion cards added to the server.

In some cases a server may lose power or become inoperable for some other reason. In such cases it is desirable to allow continued operation of the remote server management device so that the problems leading to the server fault can be observed. To allow such continued operation independent of the server, remote server management devices have been developed having battery backup power supplies.

Servers typically include peripheral component interconnect (PCI) buses to support peripheral cards. Some buses, including PCI buses, are fault intolerant and the bus lines must always be driven to known states to prevent improper operation. Also, floating bus lines can cause excess power usage due to switching. To provide uninterrupted operation of the remote server management device, the remote server management device must be isolated from the bus without deleteriously affecting the processing of its transactions.

One function of a remote server management device is to capture video display data related to the server so that it may be remotely viewed. Prior remote server management devices have stored the data in the system memory of the server. This situation is undesirable if the server loses power because the system memory is erased.

The present invention is directed to overcoming, or at least reducing the effects of, one or more of the problems set forth above.

SUMMARY OF THE INVENTION

In one aspect of the present invention, a circuit is provided for isolating a device from a bus. The circuit includes a switch and control logic. The switch has a control input and is coupled between the bus and the device. The bus includes a first plurality of bus lines, including a first grant line. The device includes a second plurality of bus lines, including a second grant line. The control logic is coupled to the control input of the switch and adapted to detect a bus isolation event, and generate a bus isolation signal in response to the bus isolation event. The control logic provides the bus isolation signal to the control input of the switch, and drives the voltage on the second grant line to a predetermined voltage in response to the bus isolation signal. The predetermined voltage is independent of the voltage on the first grant line.

In another aspect of the present invention, a method is provided for isolating a device from a bus. The method includes detecting a bus isolation event. An isolation signal is generated in response to the bus isolation event. The device is isolated from the bus in response to the isolation signal. A grant line on the device is driven to a predetermined voltage in response to the isolation signal.

BRIEF DESCRIPTION OF THE DRAWINGS

The invention may be understood by reference to the following description taken in conjunction with the accompanying drawings, in which like reference numerals identify like elements, and in which.

Figure 1:
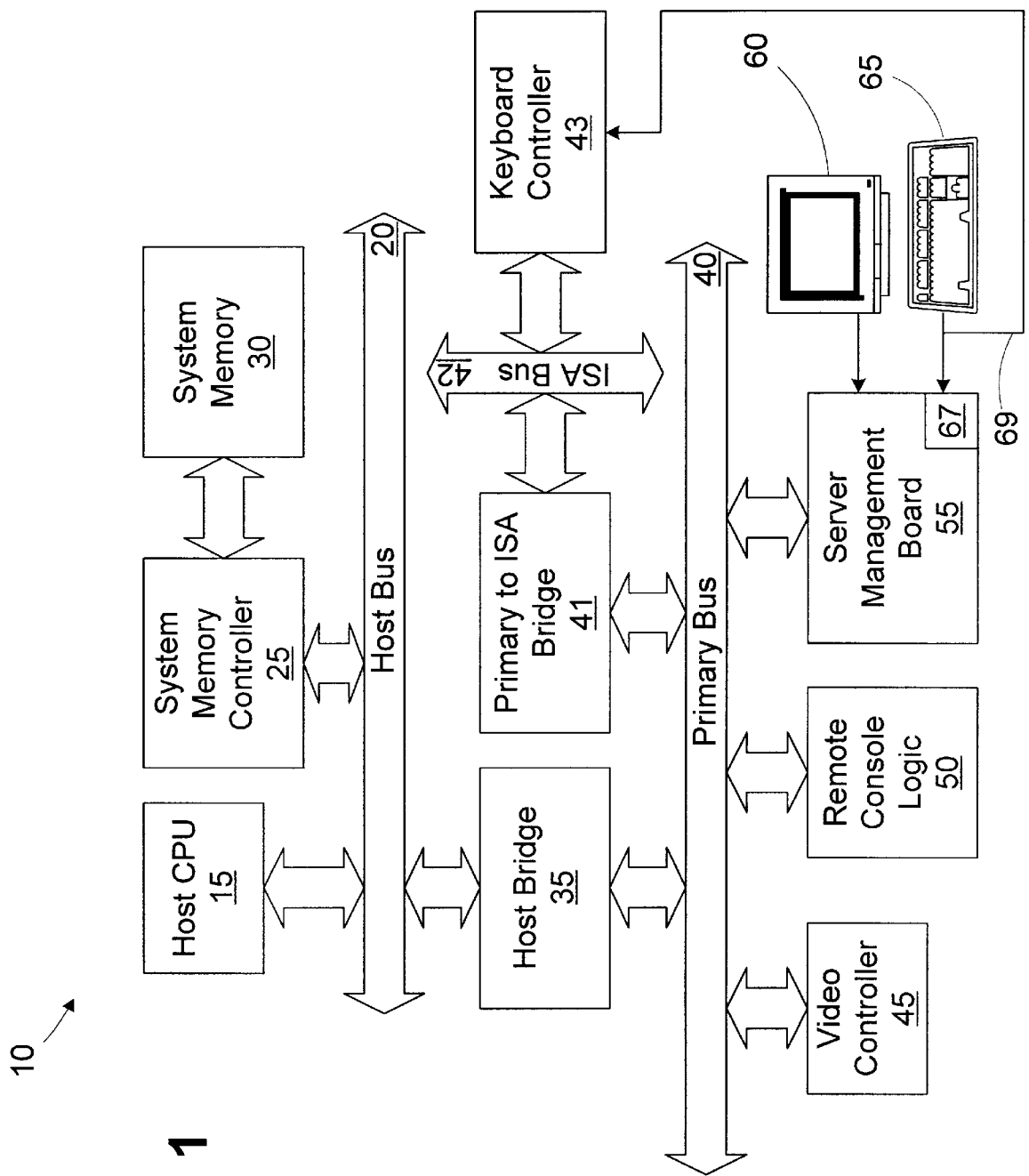
FIG. 1 is a block diagram of a computer system, such as a server.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a computer system, such as a server 10, is provided. In the illustrated embodiment, the server 10 has remote console features. Remote console features allow a second computer (not shown) remote from the computer system 10 to communicate with the server 10 to check the status and administrate the server 10. The remote console features allow the remote computer (not shown) to remotely access and administrate the server 10 without operating system intervention or dependence. Although the invention is described with respect to a server 10 application, the principles may be applied to any computer system, such as a client workstation.

The server 10 includes a host CPU 15, which may include multiple processors (not shown), coupled to a host bus 20. A system memory controller 25 is coupled to the host bus 20 and system memory 30 (e.g., DRAM). A host bridge 35 couples the host bus 20 to a primary bus 40, such as a peripheral component interconnect (PCI) bus (PCI Specification, Rev. 2.1). A Primary to ISA bridge 41 couples the primary bus 40 to an industry standard architecture (ISA) bus 42. A keyboard controller 43 is coupled to the ISA bus 42. A video controller 45, remote console logic 50, and a server management board 55 are coupled to the primary bus 40. The video controller 45 and remote console logic 50 are typically embedded on a host board (not shown) of the server 10. A monitor 60 and a keyboard 65 are coupled to the server management board 55.

The server management board 55 allows remote console operation of the server 10. As described in greater detail below, the server management board 55 has a battery backup power supply (not shown) to allow its continued operation in the event the server 10 loses power.

The server management board 55 includes a keyboard switch 67 that routes either keystrokes from the keyboard 65 or simulated keystrokes from a remote console session to the keyboard controller 43. A Y-cable 69 couples the keyboard 65 to the keyboard switch 67 and the keyboard controller 43.

The server 10 may include other buses such as a secondary PCI bus (not shown) or other peripheral devices (not shown) known in the art, which are not shown for clarity and ease of illustration.

The remote console logic 50 provides numerous individual functions that collectively provide the remote console functionality. These functions include video snooping and compression for providing video during remote access, emulation of an attached keyboard during remote access, modem sharing and emulation of a modem during remote access, and hot swapping between front and rear enclosure attached keyboards. These functions are further described in the following patent applications commonly assigned to the assignee of the present patent and incorporated herein by reference: U.S. patent application Ser. No. 08/733,254, entitled, "Video Eavesdropping and Reverse Assembly to Transmit Video Action to a Remote Console," U.S. patent application Ser. No. 08/733,521, entitled, "Transparent Keyboard Hot Plug," and U.S. patent application Ser. No. 08/733,415, entitled "Modem Sharing."

In the illustrated embodiment, the remote console logic 50 is an application specific integrated circuit (ASIC) designed to perform the functions outlined above. Alternatively, the remote console logic 50 may comprise one or more separate circuits adapted to perform similar functions.

Figure 2:
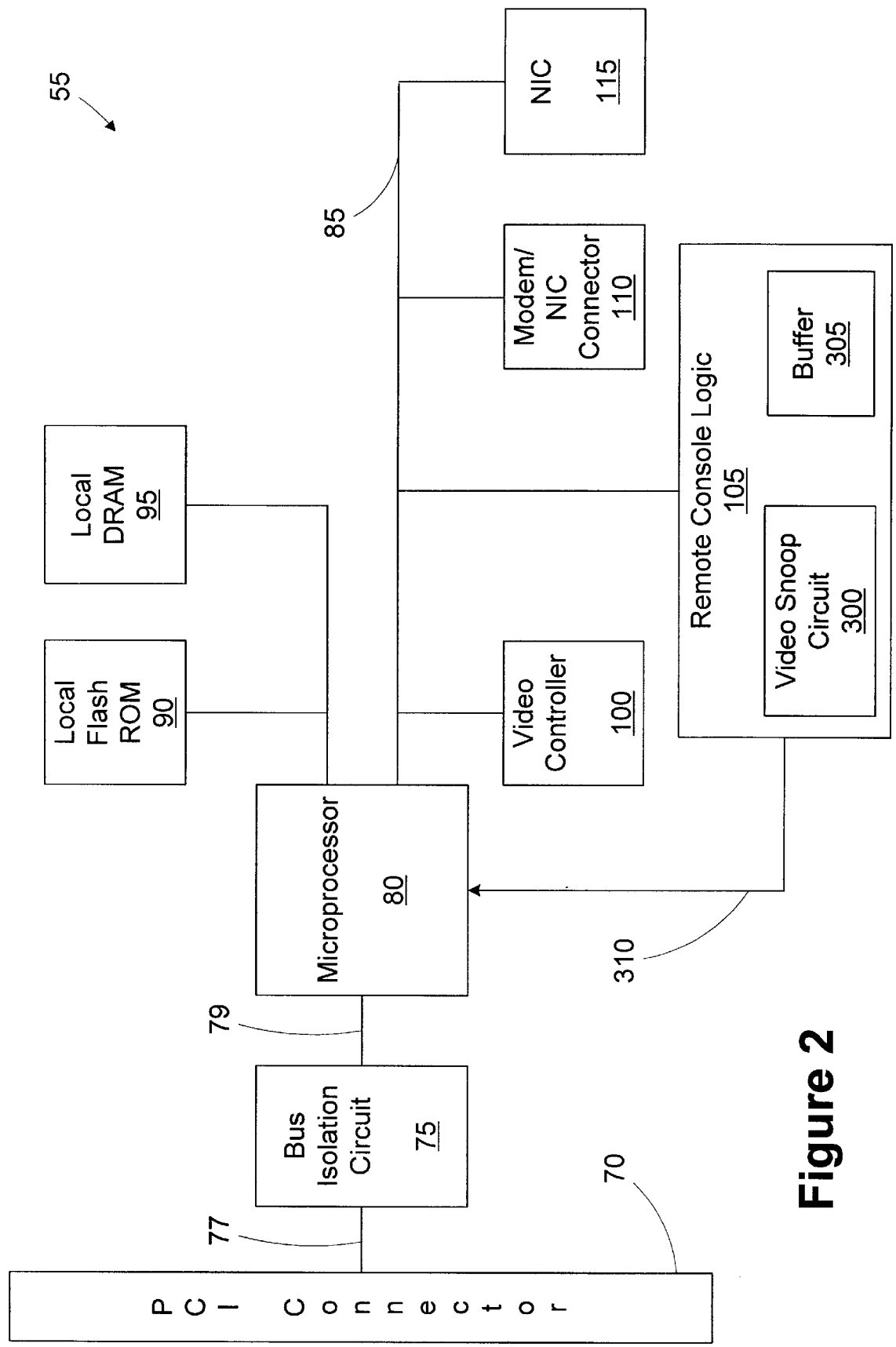
FIG. 2 is a block diagram of a server management board of the present invention installed in the server of FIG. 1.

Referring to FIG. 2, a block diagram of the server management board 55 is shown. In the illustrated embodiment, the server management board 55 is a PCI device coupled to the primary bus 40 through a PCI connector 70. The server management board 55 includes a bus isolation circuit 75 separating bus lines 77 coupled to the PCI connector 70 from bus lines 79 coupled to a microprocessor 80. In the illustrated embodiment, the microprocessor 80 is an i960RP microprocessor sold by Intel Corporation of Santa Clara, Calif. The microprocessor 80 is an embedded microprocessor that provides many functions on a single chip. The microprocessor 80 functions as a PCI—PCI bridge coupling the primary bus 40 to a secondary PCI bus 85. The server management board 50 also includes local flash ROM 90 and local DRAM 95 controlled by the microprocessor 80. The bus lines 79 coupled to the microprocessor 80 are on the primary side of the PCI to PCI bridge circuitry embedded in the microprocessor 80.

The server management board 55 also includes a video controller 100, remote console logic 105, a modem/network interface controller (NIC) connector 110, and an embedded NIC 115. The video controller 100 and the remote console logic 105 are similar to the embedded video controller 45 and the remote console logic 50 coupled to the primary bus 40. The modem/NIC connector 110 allows a modem (not shown) or network card (not shown) to be coupled to the secondary PCI bus 85. A user connecting remotely to the server management board 55 to monitor or administrate the server 10 establishes a connection with a modem (not shown) through the modem/NIC connector 110.

Figure 3:
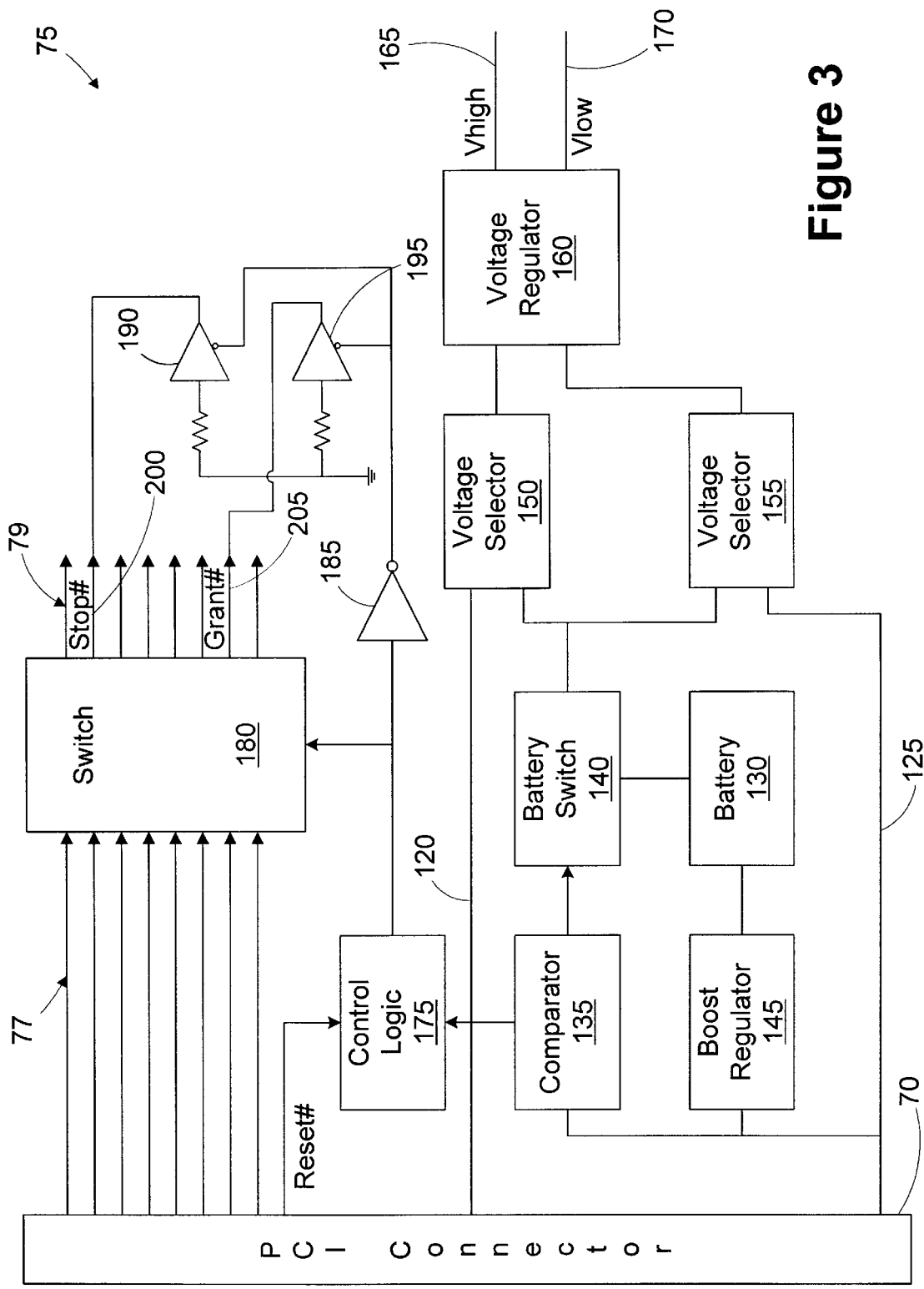
FIG. 3 is a block diagram of a portion of the bus isolation circuit of FIG. 2 related to isolating the server management board from the server.

Referring to FIG. 3, a block diagram of the bus isolation circuit 75 is provided. The server management board 55 receives power through the PCI connector 70. The bus isolation circuit 75 is coupled to a 12 volt supply line 120 and a 5 volt supply line 125. The bus isolation circuit 75 includes a battery 130 having an operating voltage of about 8 volts. A comparator 135 compares the voltage on the 5 volt supply line 125 to a predetermined threshold (e.g., 4.6 volts in the illustrated embodiment) and activates a battery switch 140 if the voltage on the 5 volt supply line 125 drops below the threshold. The voltage on the 5 volt supply line 125 dropping below the threshold indicates that the server may have lost power or is not operating properly.

The current available through the 12 volt supply line 120 is insufficient to charge the battery 130, however, the 5 volt supply line 125 can supply sufficient current. Accordingly, a boost regulator 145 is coupled between the battery 130 and the 5 volt supply line 125 to increase the voltage on the 5 volt supply line 125 to a level sufficient to maintain the charge on the battery 130. A first voltage selector 150 selects the higher of the voltage on the 12 volt supply line 120 and the battery 130, and a second voltage selector 155 selects the higher of the voltage on the 5 volt supply line 125 and the battery 130. The voltage selectors 150, 155 are coupled to a voltage regulator 160 that provides high and low voltage outputs on lines 165 and 170, respectively. In the illustrated embodiment, the high voltage on the line 165 is about 5 volts, and the low voltage on the line 170 is about 3.3 volts. The battery 130 allows the server management board 55 to continue operating in the event the server 10 loses power or ceases to operate properly.

Returning to FIG. 2, the video controller 100 processes video commands for the server 10. The embedded video controller 45 is disabled during the bootup sequence of the server 10. The server 10 detects the second video controller 100 and disables the embedded video controller 45 in response to its presence. Certain features of the embedded remote console logic 50 are also disabled in response to the detection of the remote console logic 105 present on the server management board 55, as described in greater detail below.

To operate independently of the server 10, the server management board 55 isolates the microprocessor 80 from the PCI connector 70 in response to a loss of voltage from the server 10. Again, this allows remote control and administration of the server 10 even if the server 10 loses power or ceases to operate properly. The bus isolation circuit 75 of FIGS. 3 and 4 maintains a stable operating environment for the microprocessor 80 and other devices on the server management board 55 if such an event occurs.

Figure 4:
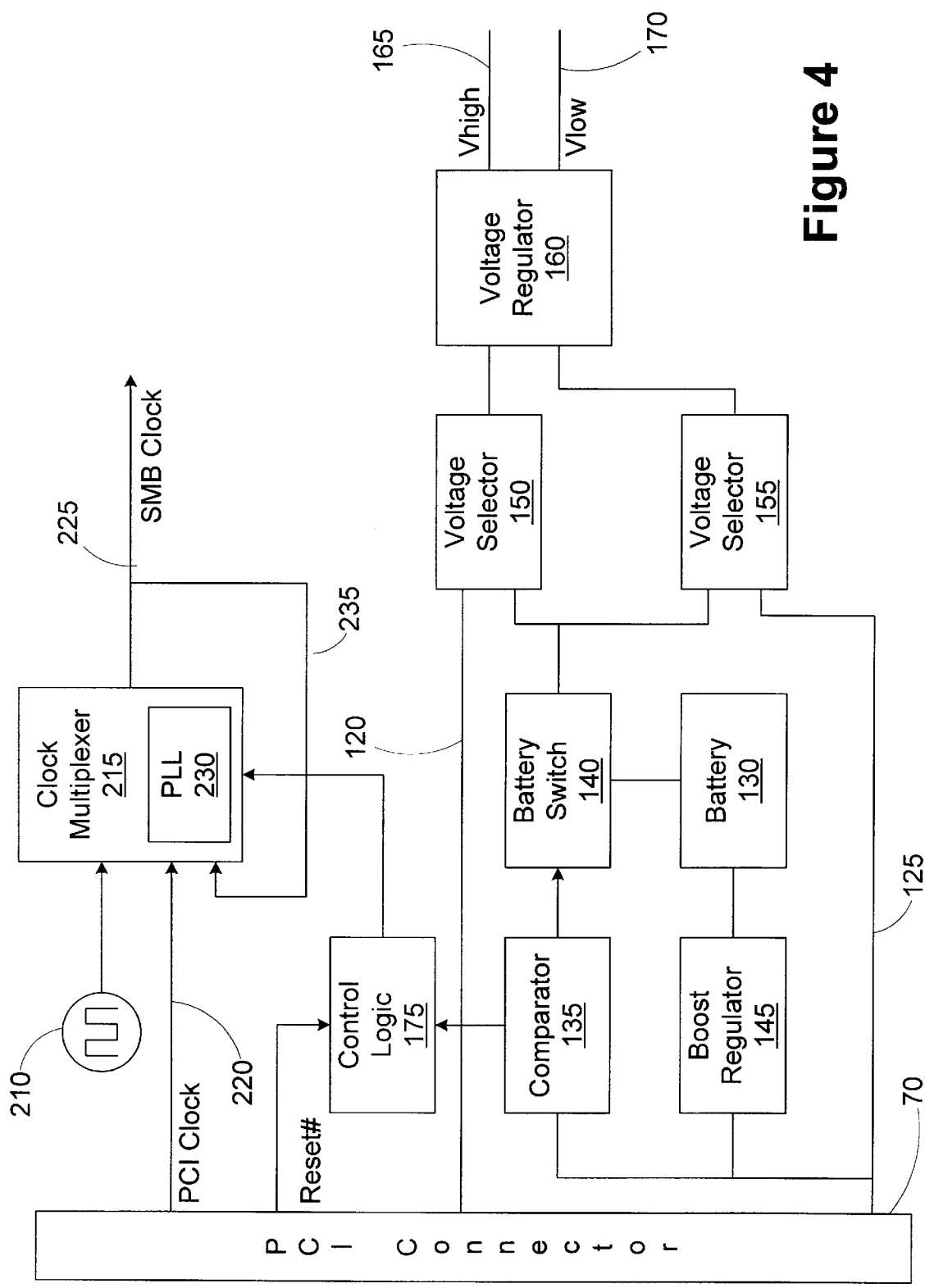
FIG. 4 is a block diagram of a portion of the bus isolation circuit of FIG. 2 related to switching the clock source for the server management board.

FIG. 3 illustrates a block diagram of a portion of the bus isolation circuit 75 responsible for isolating the microprocessor 80 from the primary bus 40, and FIG. 4 illustrates a second portion of the bus isolation circuit 75 responsible for maintaining the integrity of the clock signal on the server management board 55 during an isolation event. Referring again to FIG. 3, control logic 175 receives a power loss indicator from the comparator 135. In the illustrated embodiment, the control logic 175 is a programmable array logic device (PAL), but other logic implementations are contemplated. The control logic 175 also receives the PCI reset# signal from the primary bus 40 through the PCI connector 70. If the PCI reset# signal is asserted, the server 10 is resetting the primary bus 40. It is desirable for the microprocessor 80 to continue operating independent of such an event. The bus isolation circuit 75 isolates the microprocessor 80 from the PCI connector 70 in response to either the loss of power signal from the comparator 135 or the assertion of the PCI reset# signal on the primary bus 40. It is also desirable to isolate the server management board 55 from the server 10 while the server 10 is first starting up. This allows the server management board 55 to initialize and be ready for operation by the time the server 10 is operational. During the startup sequence of the server 10, the PCI reset# signal is asserted. The bus isolation circuit 75 responds to the PCI reset# signal and isolates the server management board 55.

To isolate the microprocessor 80 from the PCI connector 70, the control logic 175 provides a control signal to a switch 180 that opens the connections therebetween. A PCI bus is not a fault tolerant bus, and therefore the bus lines 79 must be driven to a known state when isolation occurs. Otherwise the bus lines 79 would float, resulting in indeterminate operation and excess power consumption. Rather than providing the large amount of logic necessary to individually drive each bus line to a known state, the control logic 175 simulates an arbiter initiating a bus parking event to cause the PCI—PCI bridge circuitry of the microprocessor 80 to take over and drive the bus lines 79 to a known state. Bus arbitration is known in the art and described in greater detail in the PCI specification, Rev. 2.1. Normal bus arbitration and bus parking is initiated to prevent multiple devices from competing for the same bus.

The output of the control logic 175 is coupled to an inverter 185. The output of the inverter 185 is coupled to the enable input of drivers 190, 195. The output of the driver 190 is coupled to a stop# line 200 of the bus lines 79, and the output of the driver 195 is coupled to a grant# line 205 of the bus lines 79. The inputs of the drivers 190, 195 are grounded, such that when the drivers 190, 195 are enabled in response to the isolation event, the stop# and grant# signals are asserted low. When not enabled, the outputs of the drivers 190, 195 are in a high impedance state and have negligible effect on the operation of the bus lines 79.

Asserting the stop# signal on the line 200 notifies the microprocessor 80 that it must abort any pending bus transactions and prevents the initiation of any new transactions on the primary bus 40. Asserting the grant# signal on the line 205 notifies the microprocessor 80 that ownership of the bus has been granted to the microprocessor 80. Because the microprocessor 80 had not requested bus ownership by asserting a request# signal (not shown), the microprocessor 80 recognizes the bus parking event and drives the bus lines 79 to a known state. As defined in the PCI Specification, any PCI device that receives a grant# signal without first having requested bus ownership must interpret that combination as a bus parking event.

By simulating a bus parking event, the bus isolation circuit 75 isolates the server management board 55 from the primary bus 40 during reset or fault conditions, thus allowing continued operation of the server management board 55 independent of the server 10.

PCI buses and attached devices operate using a common PCI clock. In the illustrated embodiment, the PCI clock operates at a frequency of 33 MHz. During fault conditions (e.g., loss of power to the server 10), the PCI clock is not valid. Also during a reset condition on the primary bus 40, the PCI clock may not be valid (e.g., during the startup sequence of the server 10). To ensure proper operation of the server management board 55 while isolated from the server 10, a local clock 210 (as seen in FIG. 4) is provided. The microprocessor 80 and other devices coupled to the secondary PCI bus 85 should receive a stable clock source during isolation events. FIG. 4 illustrates a second portion of the bus isolation circuit 75 responsible for maintaining the integrity of the clock signal on the server management board 55 during such an isolation event. The power supply lines 120, 125, and power loss detection elements of FIG. 3 are duplicated in FIG. 4 for ease of illustration. The control logic 175 responsible for isolating the bus lines 79 also provides control signals to maintain clock integrity.

The clock isolation portion of the bus isolation circuit 75 includes a local clock 210 operating at essentially the same frequency as the PCI clock on the primary bus 40, and a clock multiplexer 215. The clock multiplexer 215 is coupled to both the local clock 210 and the PCI clock on a bus line 220 from the PCI connector 70. The clock multiplexer 215 receives a control input from the control logic 175 indicating a bus isolation condition due to the loss of power detected by the comparator 135 or due to the assertion of the reset# signal. The clock multiplexer 215 provides a system management board (SMB) clock as an output on a line 225. The microprocessor 80 and other devices on the secondary PCI bus 85 are synchronized using the SMB clock on line 225.

While the server 10 is starting up, there is no valid PCI clock on the primary bus 40, so the reset# signal is asserted. Accordingly, the clock multiplexer 215 selects the local clock 210 to allow the server management board 55 to initialize and begin operation. When the server 10 and the primary bus 40 are operational, the reset# signal is deasserted and the clock multiplexer 215 switches over to the PCI clock. If a subsequent isolation event is signaled by the comparator 135, or the assertion of the reset# signal, the control logic 175 causes the clock multiplexer 215 to switch back to the local clock 210. As a result, clock integrity is maintained during bus isolations to allow proper operation of the server management board 55 independent of the server 10. There are several features of the clock multiplexer 215 useful in maintaining clock integrity.

The PCI clock and the local clock 210 operate at essentially the same frequency, but are not synchronized. The phase difference between the two clocks may cause a problem for the microprocessor 80 and associated devices if the clock multiplexer 215 were to abruptly transition between the clocks. A phase lock loop (PLL) 230 in the clock multiplexer 215 prevents the SMB clock on the output line 225 from abruptly changing phase. Alternatively, the phase of the SMB clock slowly changes from its current value to the phase of the newly selected clock source. A feedback loop 235 aids the phase lock loop 230 in controlling the phase change.

For example, assume the clock multiplexer 215 has been operating for a period of time using the PCI clock. The SMB clock is synchronized (i.e., same phase) with the PCI clock. When a bus isolation event occurs the control logic 175 instructs the clock multiplexer 215 to change to the local clock 210. The local clock 210 is generally be out of phase with the PCI clock. The phase lock loop 230 and feedback loop 235 slowly changes the phase of the SMB clock until it matches that of the local clock 210. If the clock multiplexer 215 is subsequently switched back to the PCI clock, the phase is again slowly adjusted until the SMB clock is resynchronized with the PCI clock.

The microprocessor 80 and associated devices can tolerate only a small change in the SMB clock each cycle. In the illustrated embodiment, the microprocessor 80 can tolerate a period deviation of less than about 10 picoseconds per cycle. Accordingly the clock multiplexer 215 is configured such that the phase lock loop 230 does not cause a period deviation of greater than 10 picoseconds per cycle. As a result the microprocessor 80 can tolerate the slow transition of the SMB clock to match the selected clock input (e.g., PCI clock or local clock 210). One such suitable clock multiplexer 215 is a MC88915TFN70 clock multiplexer sold by Motorola Inc.

In the example described above, the PCI clock and local clock 210 operated at essentially the same frequency. It is contemplated, however, that the PCI clock and local clock 210 may operate at different frequencies. For example, to conserve power, the local clock may operate at a lower frequency, such as 16 MHz. When the server management board 55 is isolated from the server 10, less processing speed may be tolerable in exchange for increased battery 130 life. Accordingly, the frequency of the local clock 210 may be reduced to conserve power in the battery 130. The clock multiplexer 215 limits the period variation in the SMB clock while transitioning from the PCI clock to the lower frequency local clock 210, thus providing a smooth transition.

Although the bus isolation features are described above in reference to the server management board 55, they are applicable to any device that is provided with alternate power to operate independently of its host system.

Returning to FIGS. 1 and 2, one function of the server management board 55 is to monitor, or snoop, the video operations and store recent display information. Such snapshots of the events preceding a fault can be retrieved using the server management board 55 if power is lost to the server 10.

Without the server management board 55 installed in the server 10, the embedded remote console logic 50 would capture, decode, and buffer the video data. When the remote console logic 50 fills up, a system management interrupt is sent to the host CPU 15. The host CPU 15 downloads the video data to the system memory 30 to allow further video snooping. If the server 10 were to lose power, the contents of the system memory 30 would be erased and the video data would not be available for remote retrieval.

The remote console logic 105 on the server management board 55 includes a video snooping circuit 300 that monitors transactions on the secondary PCI bus 85 destined for the video controller 100, decodes the transactions, compresses the video data, and stores the video data in a buffer 305 for future retrieval. When the buffer 305 is full, the remote console logic 105 notifies the microprocessor 80 over an interrupt line 310. The microprocessor 80 downloads the contents of the buffer 305 to the local DRAM 95 so that further video transactions may be buffered.

Figure 5:
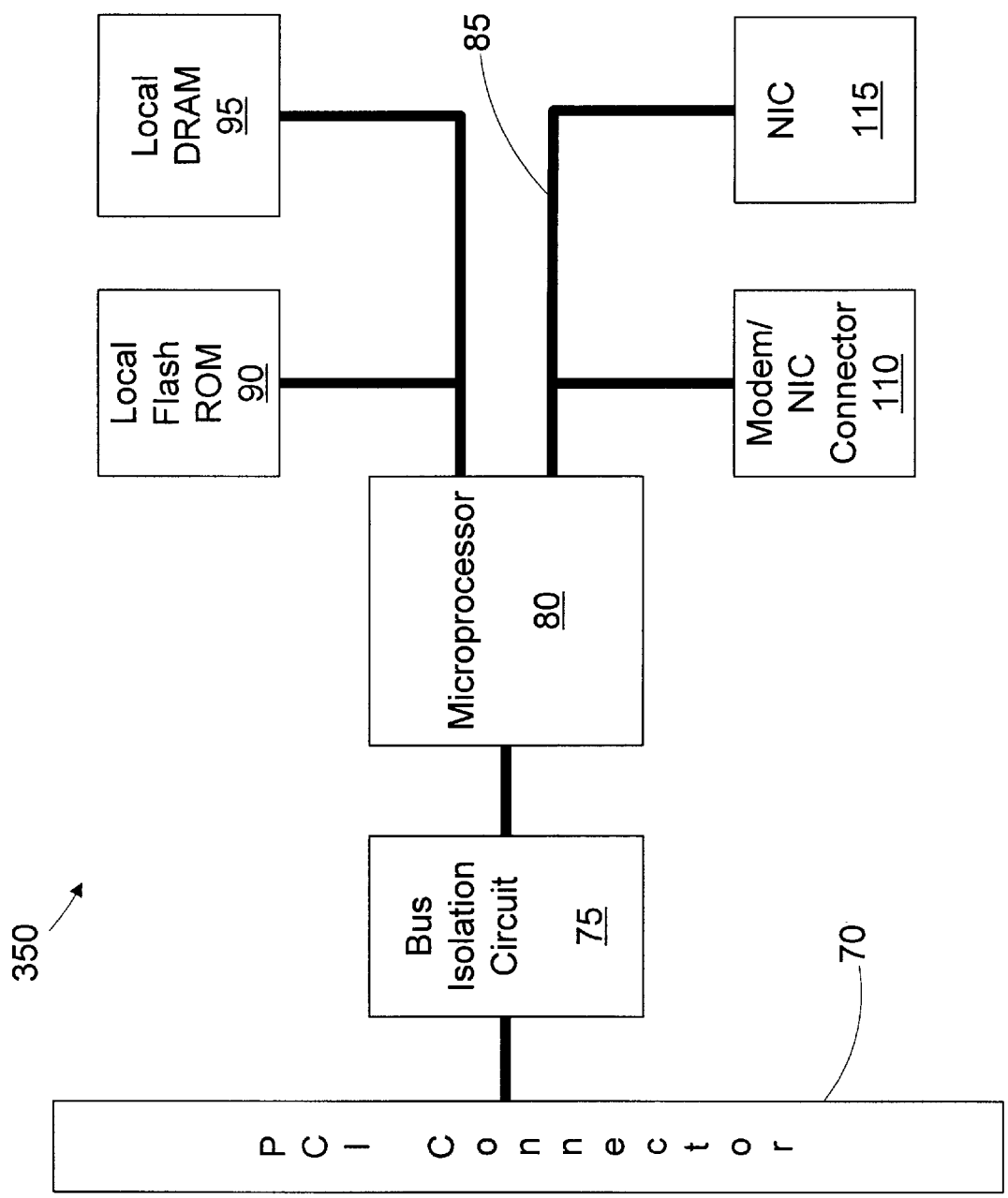
FIG. 5 is a block diagram of an alternative embodiment of a remote server management board.

FIG. 5 illustrates a block diagram of an alternative embodiment of a server management board 350. The server management board 350 of FIG. 5 is similar to the server management board 55 of FIG. 2 except that it does not include its own video controller 100 or remote console logic 105. The server management board 350 uses the embedded video controller 45 and remote console logic 50 of the server 10 to snoop video and buffer video data.

Figure 6:
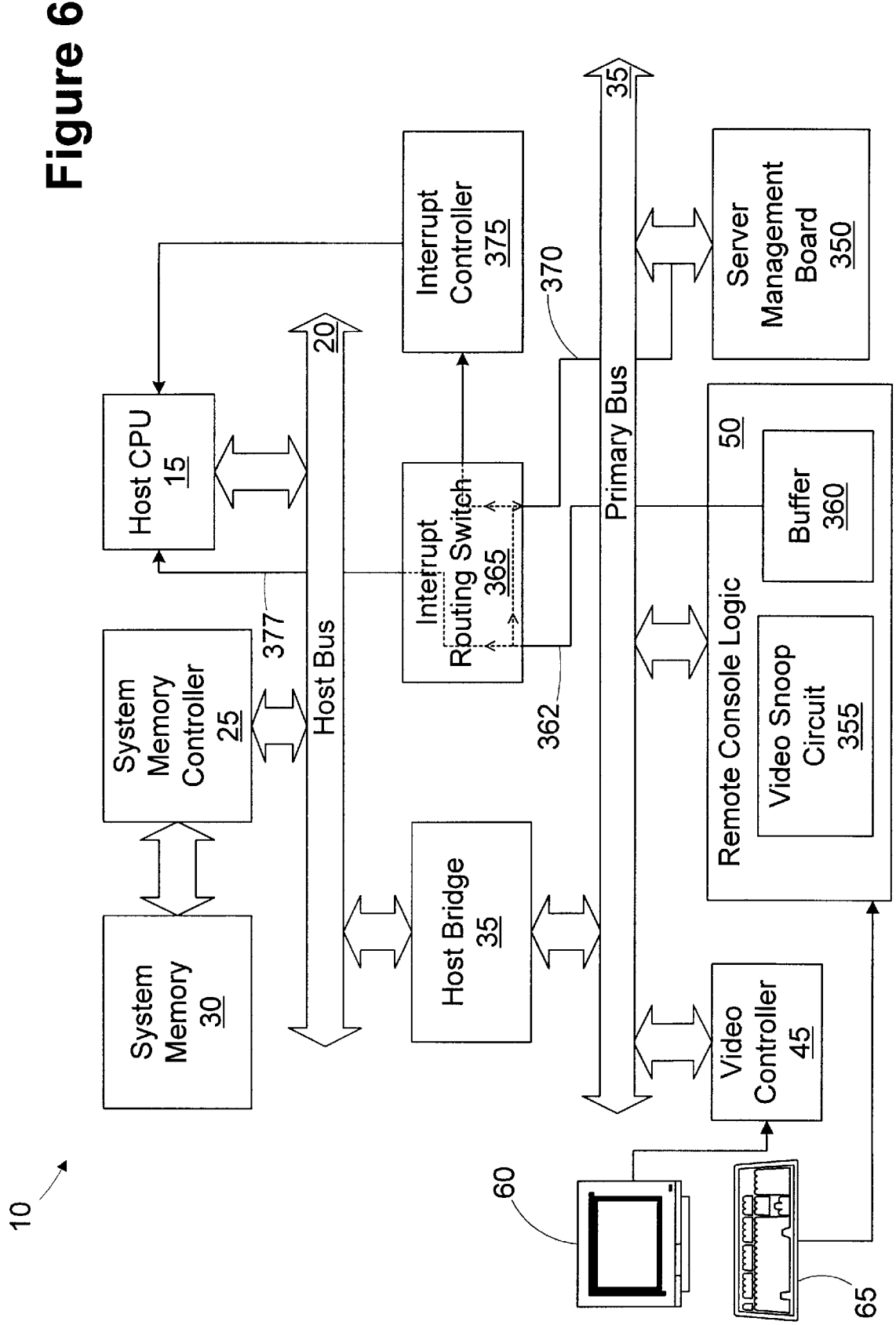
FIG. 6 is a block diagram of a server including the alternative remote server management board of FIG. 5.

FIG. 6 illustrates a block diagram of a server 10 including the server management board 350. A video snoop circuit 355 on the embedded remote console logic 50 captures video transactions on the primary bus 40 destined for the embedded video controller 45 and stores the video data in a buffer 360. When the buffer 360 is full, the remote console logic 50 sends an interrupt signal on a buffer interrupt line 362 to an interrupt routing switch 365. The interrupt routing switch 365 routes the buffer interrupt line 362 to the server management board 350 through a shared interrupt line 370 on the PCI connector 70. The microprocessor 80 processes the interrupt from the buffer 360 and downloads the buffer 360 to its local DRAM 95. This allows the video data to be stored on the server management board 350 such that it will be available for remote retrieval in the event the server 10 loses power.

Typically, a shared interrupt is an output from a PCI device that is routed to an interrupt controller 375 and processed by the host CPU 15. The interrupt controller 375 is a standard interrupt controller well known in the art. Also, when no server management board 350 is present, the remote console logic 50 snoops video data and notifies the host CPU 15 when its buffer 360 is full through a system management interrupt 377. The interrupt routing switch 365 allows the shared interrupt line 370 to operate as in its standard mode when no server management board 350 is present (i.e., the interrupt routing switch 365 routes the shared interrupt line 370 to the interrupt controller 375 and the buffer interrupt line 362 to the host CPU 15), or as an input to the server management board 350. In the illustrated embodiment, a particular PCI slot (not shown) in the server 10 is designated for the server management board 350. The interrupt routing switch 365 is connected for rerouting the shared interrupt line 370 for only this PCI slot (not shown). It is contemplated that additional interrupt routing switches 365 may be included to allow any of the PCI slots (not shown) in the server 10 to support the interrupt rerouting for the server management board 350. During the bootup sequence of the server 10, all the attached PCI devices are identified. When the server 10 identifies the server management board 350, the interrupt routing switch 365 is enabled to reroute the shared interrupt line 370 as described above.

The server management board 350 provides several advantages. First, the need for a Y-cable 69 is obviated because the monitor 60 and the keyboard 65 may be connected directly to the embedded video controller 45 and keyboard controller (not shown) on the remote console logic 50. Also, because the video operations for the server 10 are not handled by the server management board 350, the server management board 350 may be replaced without powering down the server 10 if the server supports PCI hot plug devices. Finally, the total cost of the server 10 is reduced due to the reduction in redundant hardware (i.e., the video controller 45 and remote console logic 50).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A circuit for isolating a device from a bus, comprising:
    a switch having a control input and being coupled between the bus and the device, wherein the bus includes a first plurality of bus lines; and control logic coupled to the control input of the switch and adapted to detect a bus isolation event, generate a bus isolation signal in response to the bus isolation event, provide the bus isolation signal to the control input of the switch, and drive the voltage on a subset of the second plurality of bus lines to a predetermined voltage in response to the bus isolation signal.

2. The circuit of claim 1, wherein the first plurality of bus lines includes a power line, the control logic includes a comparator coupled to the power line, and the control logic is adapted to provide the bus isolation signal when the voltage on the power line drops below the predetermined threshold.

3. The circuit of claim 2, wherein the first plurality of bus lines includes a first grant line, the second plurality of bus lines includes a second grant line, the control logic is further adapted to drive the voltage on the second grant line to a predetermined voltage in response to the bus isolation signal, the predetermined voltage being independent of the voltage on the first stop line, and the control logic includes a first driver having an input coupled to the predetermined voltage, an output coupled to the second grant line, and a control input adapted to receive the bus isolation signal.

4. The circuit of claim 3, wherein the predetermined voltage is ground.

5. The circuit of claim 1, wherein the predetermined voltage is ground.

6. The circuit of claim 1, wherein the first plurality of bus lines includes a first stop line, the second plurality of bus lines includes a second stop line, and the control logic is further adapted to drive the voltage on the second stop line to a predetermined voltage in response to the bus isolation signal, the predetermined voltage being independent of the voltage on the first stop line.

7. The circuit of claim 6, wherein the control logic includes a second driver having an input coupled to the predetermined voltage, an output coupled to the second stop line, and a control input adapted to receive the bus isolation signal.

8. The circuit of claim 6, wherein the predetermined voltage is ground.

9. The circuit of claim 1, wherein the first plurality of bus lines includes a reset line, and the control logic is further adapted to provide the bus isolation signal in response to the presence of a reset signal on the reset line.

10. The circuit of claim 1, wherein the first plurality of bus lines includes a first grant line, the second plurality of bus lines includes a second grant line, and the control logic is further adapted to drive the voltage on the second grant line to a predetermined voltage in response to the bus isolation signal, the predetermined voltage being independent of the voltage on the first stop line.

11. A computer system, comprising:
a bus having a first plurality of bus lines;
a device coupled to the bus, the device including:
  a second plurality of bus lines;
  a switch having a control input and being coupled between the bus and the second plurality of bus lines; and
  control logic coupled to the control input of the switch and adapted to detect a bus isolation event, generate a bus isolation signal in response to the bus isolation event, provide the bus isolation signal to the control input of the switch, and drive the voltage on a subset of the second plurality of bus lines to a predetermined voltage in response to the bus isolation signal.

12. The computer system of claim 11, wherein the first plurality of bus lines includes a power line, the control logic includes a comparator coupled to the power line, and the control logic is adapted to provide the bus isolation signal when the voltage on the power line drops below the predetermined threshold.

13. The computer system of claim 12, wherein the first plurality of bus lines includes a first grant line, the second plurality of bus lines includes a second grant line, and the control logic includes a first driver having an input coupled to the predetermined voltage, an output coupled to the second grant line, and a control input adapted to receive the bus isolation signal.

14. The computer system of claim 13, wherein the predetermined voltage is ground.

15. The computer system of claim 11, wherein the predetermined voltage is ground.

16. The computer system of claim 11, wherein the first plurality of bus lines includes a first stop line, the second plurality of bus lines including a second stop line, and the control logic is further adapted to drive the voltage on the second stop line to a predetermined voltage, the predetermined voltage being independent of the voltage on the first stop line.

17. The computer system of claim 16, wherein the control logic includes a second driver having an input coupled to the predetermined voltage, an output coupled to the second stop line, and a control input adapted to receive the bus isolation signal.

18. The computer system of claim 16, wherein the predetermined voltage is ground.

19. The computer system of claim 11, wherein the first plurality of bus lines includes a reset line, and the control logic is further adapted to provide the bus isolation signal in response to the presence of a reset signal on the reset line.

20. The computer system of claim 11, wherein the device includes a bridge device adapted to drive the voltages on the second plurality of bus lines to a predetermined state in response to the predetermined voltage on the second grant line.

21. The computer system of claim 20, wherein the bridge device comprises a microprocessor.

22. The computer system of claim 16, wherein the device is adapted to initiate transactions on the bus, and the device ceases to initiate transactions in response to the predetermined voltage on the second stop line.

23. The computer system of claim 22, wherein the device includes a microprocessor adapted to initiate the transactions.

24. The computer system of claim 12, further comprising a first power supply coupled to the bus, the first power supply being adapted to provide power to the power line, wherein the device further includes a second power supply, the second power supply being independent of the first power supply.

25. The computer system of claim 24, wherein the second power supply comprises a battery.

26. The computer system of claim 11, wherein the device comprises a remote server management board.

27. The computer system of claim 11, wherein the bus comprises a peripheral component interconnect bus.

28. The computer system of claim 11, wherein the first plurality of bus lines includes a first grant line, the second plurality of bus lines includes a second grant line, and the control logic is further adapted to drive the voltage on the second grant line to a predetermined voltage in response to the bus isolation signal, the predetermined voltage being independent of the voltage on the first stop line.

29. A circuit for isolating a device from a bus, the device including a grant line, comprising:

means for detecting a bus isolation event;

means for generating a isolation signal in response to the bus isolation event;

means for isolating the device from the bus in response to the isolation signal; and means for driving a control line of the device to a predetermined voltage in response to the isolation signal, the control line being isolated from the bus.

30. A method for isolating a device from a bus, comprising:

detecting a bus isolation event;

generating an isolation signal in response to the bus isolation event;

isolating the device from the bus in response to the isolation signal; and driving a control line of the device to a predetermined voltage in response to the isolation signal, the control line being isolated from the bus.

31. The method of claim 30, further comprising driving a stop line on the device to a predetermined voltage in response to the isolation signal.

32. The method of claim 30, wherein detecting the bus isolation vent includes detecting a reset signal on a reset line of the bus and generating the isolation signal in response to the reset signal.

33. The method of claim 30, wherein detecting the bus isolation event includes detecting a loss of power on the bus.

34. The method of claim 30, wherein driving the grant line includes grounding the grant line.

35. The method of claim 31, wherein driving the stop line includes grounding the stop line.

36. The method of claim 33, wherein detecting the loss of power includes comparing the voltage on a power line of the bus to a predetermined voltage.

37. The method of claim 30, wherein driving the control line comprise grounding a grant line of the device.

* * * * *